United States Patent
Sugiyama

[11] Patent Number: 5,959,419
[45] Date of Patent: Sep. 28, 1999

[54] ENERGIZATION CONTROLLER OF ELECTRIC MOTOR

[75] Inventor: Masanori Sugiyama, Aichi-ken, Japan

[73] Assignee: Aisin Seiki Kabushiki Kaisha, Kariya, Japan

[21] Appl. No.: 09/106,071

[22] Filed: Jun. 29, 1998

[51] Int. Cl.$^6$ .................................................. H02P 7/05
[52] U.S. Cl. ...................... 318/293; 318/432; 318/701
[58] Field of Search .................... 318/254, 280, 318/287, 291, 293, 432, 433, 700, 701

[56] References Cited

U.S. PATENT DOCUMENTS

| | | | |
|---|---|---|---|
| 4,710,686 | 12/1987 | Guzik | 318/293 |
| 4,879,641 | 11/1989 | Rossi et al. | 363/98 |
| 5,552,683 | 9/1996 | Dargent | 318/287 |
| 5,744,922 | 4/1998 | Neary et al. | 318/293 |
| 5,801,504 | 9/1998 | Endo et al. | 318/434 |
| 5,844,387 | 12/1998 | Mukai et al. | 318/432 |

FOREIGN PATENT DOCUMENTS

| | | |
|---|---|---|
| 0833439 | 4/1998 | European Pat. Off. . |
| 19704089 | 8/1998 | Germany . |
| 8-172793 | 7/1996 | Japan . |

*Primary Examiner*—Bentsu Ro
*Attorney, Agent, or Firm*—Sughrue, Mion, Zinn, Macpeak & Seas, PLLC

[57] ABSTRACT

An energization controller for an electric motor maintains a desired chopping frequency without increasing a current amplitude. The energization controller is provided with chopping control device which turns off both first and second switching elements of energization circuits of an H-type circuit together with a coil of the electric motor for a predetermined period of time and then turns on only the second switching element when a value of current flowing through the coil exceeds a reference current value and which turns on both the first and second switching elements when the value of current flowing through the coil falls below the reference current value and the predetermined period of time elapses.

2 Claims, 14 Drawing Sheets

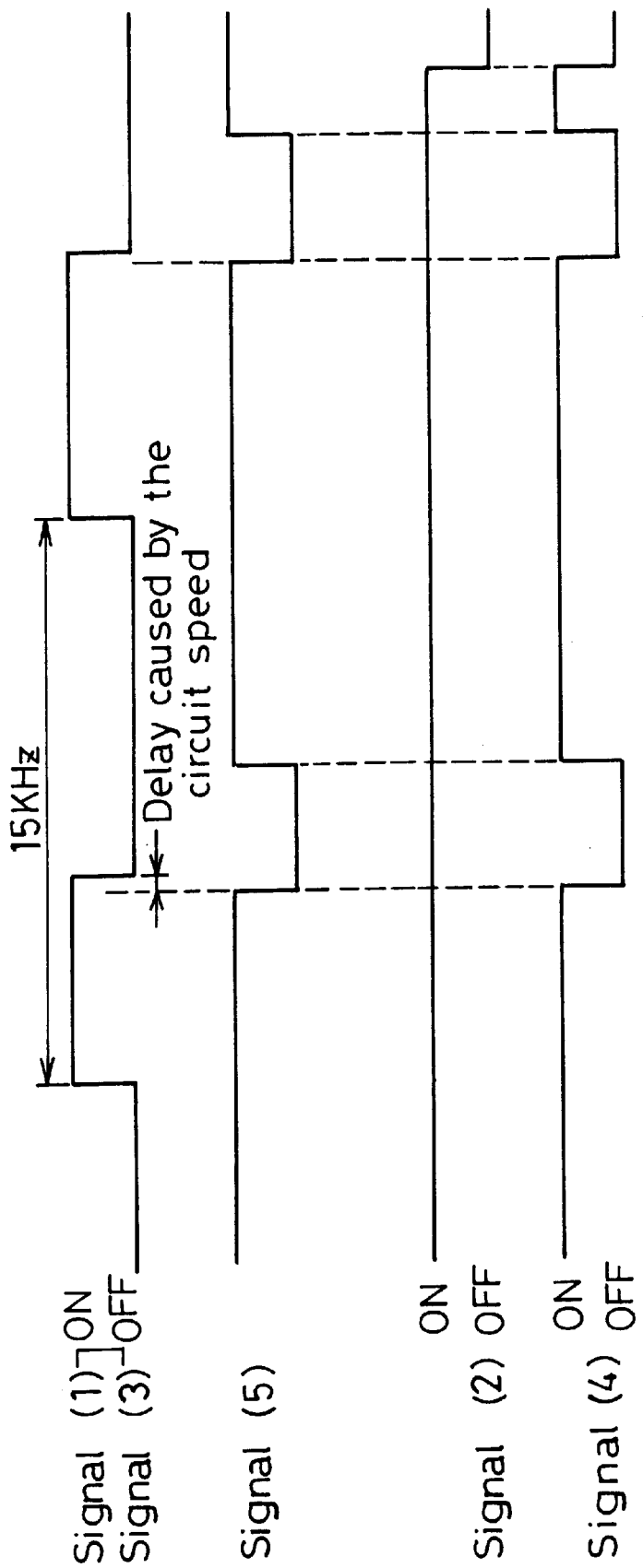

ENERGIZATION CONTROLLER OF ELECTRIC MOTOR

BACKGROUND OF THE INVENTION

1. Field of the Invention:

The present invention relates to an energization controller for controlling ON/OFF of an H-type switching circuit for feeding chopped electricity to the coils of an electric motor.

2. Description of Related Art:

In general, an energization controller of this type controls the energization by detecting a value of current flowing through the coil by a resistor or the like, by comparing the detected current value with a predefined reference current value in a binary fashion, by turning on a switching element when the reference current value is greater than the detected current value and by turning off the switching element when the reference current value is equal to or falls below the detected current value. Thus the switching element repeats ON and OFF so that the average value of the current flowing through the coil is controlled to a value corresponding (or close) to the reference current value. By the way, in the energization controller of this type, the higher the ON/OFF frequency (chopping frequency) of the switching element, the more the energy loss increases in the switching element, thus increasing calorific power. Therefore, it is not preferable to increase the chopping frequency too much. When the chopping frequency is too low, in contrast, a difference between the reference current value and the controlled current value increases, thus dropping the accuracy of the control. Further, it is not preferable for the chopping frequency to fall within the human audible frequency range because mechanical vibrations caused by the chopping of the current sounds like noise to human ears.

There has been proposed in Japanese Patent Laid Open No. Hei. 8-172793 an energization controller which comprises enable signal generating means for generating an enable flag signal which is set at a first level every time a signal for turning on/off the switching element is switched from ON to OFF or when switched from OFF to ON and which is set at a second level every time a reference chopping timing which occurs almost at constant period comes, and which causes the chopping frequency to approach a desired frequency (in the vicinity of the upper limit of the human audible frequency range, e.g. 15 KHz) by prohibiting the energization of the coil from being switched from OFF to ON or from ON to OFF during the period when the enable flag signal is on the first level.

In this energization controller, an H-type switching circuit is used to control a motor energizing current by a PWM to smooth the rise and fall of the energization and to control switching modes to improve the shortage of torque.

For instance, as shown in FIGS. 13a and 13b, the H-type switching circuit comprises a first switching element 3a interposed between one end of an electric coil 1a of the electric motor and a first power line 2a, a second switching element 3b interposed between the other end of the electric coil 1a and a second power line 2b, a first diode D1 which is interposed between one end of the coil 1a and the second power line 2b and which permits a current to conduct from the latter to the former and a second diode D2 which is interposed between the other end of the coil 1a and the first power line 2a and which permits a current to conduct from the former to the latter.

A rotational driving current flows through the electric coil 1a as shown in FIG. 13a when the first and second switching elements 3a and 3b are both turned on and a feedback current to the power source caused by an induced voltage of the electric coil 1a flows through the electric coil 1a as shown in FIG. 13b when they are both turned off. A pulsating current whose falling speed is relatively quick flows through the electric coil 1a by repeatedly turning on and off the energization as described above alternately by the PWM control. This switching mode will be referred to as "hard-chopping" in the present specification. Energy generated by the electric coil 1a is supplied (regenerated) to the first power line 2a and the current sharply decreases at the time interval during which the first and second switching elements 3a and 3b are both turned off as shown in FIG. 13b in the hard-chopping mode.

A pulsation current whose falling speed is relatively slow flows through the electric coil 1a by alternately repeating states of turning on both of the first and second switching elements 3a and 3b as shown in FIG. 14a (similarly to FIG. 13a) and of turning off only the first switching element 3a while keeping the second switching element 3b ON as shown in FIG. 14b. This switching mode will be referred to as "soft-chopping" in the present specification. The current decreases moderately during the period in which the first switching element 3a is OFF and the second switching element 3b is ON as shown in FIG. 14b in the soft-chopping mode.

The energization controller disclosed in the above-mentioned Japanese Patent Laid Open No. Hei. 8-172793 has eliminated the problem of shortage of rotation torque by selecting the above-mentioned "hard-chopping" and "soft-chopping" based on the number of revolutions of the motor and required torque.

A switched reluctance motor (hereinafter referred to as an "SR motor") comprises a rotor which is generally constructed so that pole portions protrude outward, a stator which is constructed so that pole portions protrude inward and a coil wound in concentration on each pole of the stator. In the motor, magnetic mechanical resistance varies depending on rotational position of the rotor with respect to the stator, so that inductance L of the coil varies accordingly. When this inductance L is small, the coil current falls with a desired falling speed in either chopping mode of the above-mentioned hard-chopping and soft-chopping modes, so that it is possible to approach the desired chopping frequency in the above-mentioned prior art energization controller. However, when the inductance L is large, the falling speed of the coil current slows down during the above-mentioned soft-chopping mode and the state of the reference current value lasts even when the reference chopping timing passes, so that switching of the signal for turning the on/off switching element from OFF to ON is delayed. Due to that, the chopping frequency drops and mechanical vibrations caused by the chopping sounds like noise to human ears.

Although the chopping frequency will not drop in the above-mentioned hard-chopping mode even when the inductance L is large, the amplitude of the pulsation of the current caused in switching the switching element ON/OFF becomes large, so that pulsation of magnetic attractive force applied to the rotor of the SR motor becomes large, thus causing vibrations and loud noise.

Accordingly, it is an object of the present invention to keep the desired chopping frequency without increasing the current amplitude in the energization controller of the electric motor.

SUMMARY OF THE INVENTION

An energization controller for an electric motor controls the ON/OFF energization of coils by comparing the relationship of magnitude of a first signal corresponding to a current which is chopped and which actually flows through the coil of the electric motor and a second signal defining the value of a reference current and by utilizing a binary signal corresponding to the result of the comparison. The energization controller comprises first switching means interposed between said one end of the electric coil and a first power line; second switching means interposed between the other end of the electric coil and a second power line; a first diode which is interposed between one end of the electric coil and the second power line and which permits a current to conduct from the latter to the former; a second diode which is interposed between the other end of the electric coil and the first power line and which permits a current to conduct from the former to the latter; chopping control means which turns on the second switching means after turning off both of the first and second switching means for a predetermined period of time when the first signal is larger than the second signal and which turns on both of the first and second switching means when the first signal falls below the second signal and when a fixed time has elapsed.

In the above-disclosed controller, it is possible to arrange for the chopping control means to turn off both the first and second switching means when the first signal is larger than the second signal until the first signal falls below the second signal and turns on only the second switching means after the elapse of the fixed time elapses. It is noted that in the above-mentioned controller, the fixed time is the time from when the first and second switching means were both turned the last time.

According to the above-mentioned means, the coil current falls with a relatively quick falling speed by turning off both the first and second switching means for a predetermined time (hard-chopping mode) when the first signal is larger than the second signal and then the coil current falls with a relatively slow falling speed by turning on only the second switching means (soft-chopping mode), so that it is possible to maintain the desired chopping frequency without increasing the current amplitude regardless of the magnitude of inductance of the coil.

The specific nature of the invention, as well as other objects, uses and advantages thereof, will clearly appear from the following description and from the accompanying drawings.

BRIEF DESCRIPTION OF DRAWINGS

FIG. 12 is a time chart showing the operation of the partial hard-chopping circuit shown in FIG. 11;

FIGS. 13a and 13b are diagrams showing the motor current in a hard-chopping mode of an H-type switching circuit of the prior art energization controller, wherein FIG. 13a shows a current conducting direction when a driving current flows through the motor and FIG. 13b shows a current conducting direction when the supply of the driving current is shut off; and FIGS. 14a and 14b are diagrams showing the motor current in a soft-chopping mode of the H-type switching circuit of the prior art energization controller, wherein FIG. 14a shows a current conducting direction when a driving current flows through the motor and FIG. 14b shows a current conducting direction when the supply of the driving current is shut off.

DESCRIPTION OF PREFERRED EMBODIMENTS

Preferred embodiments of an energization controller of an electric motor of the present invention will be explained below based on the drawings.

Figure 1:
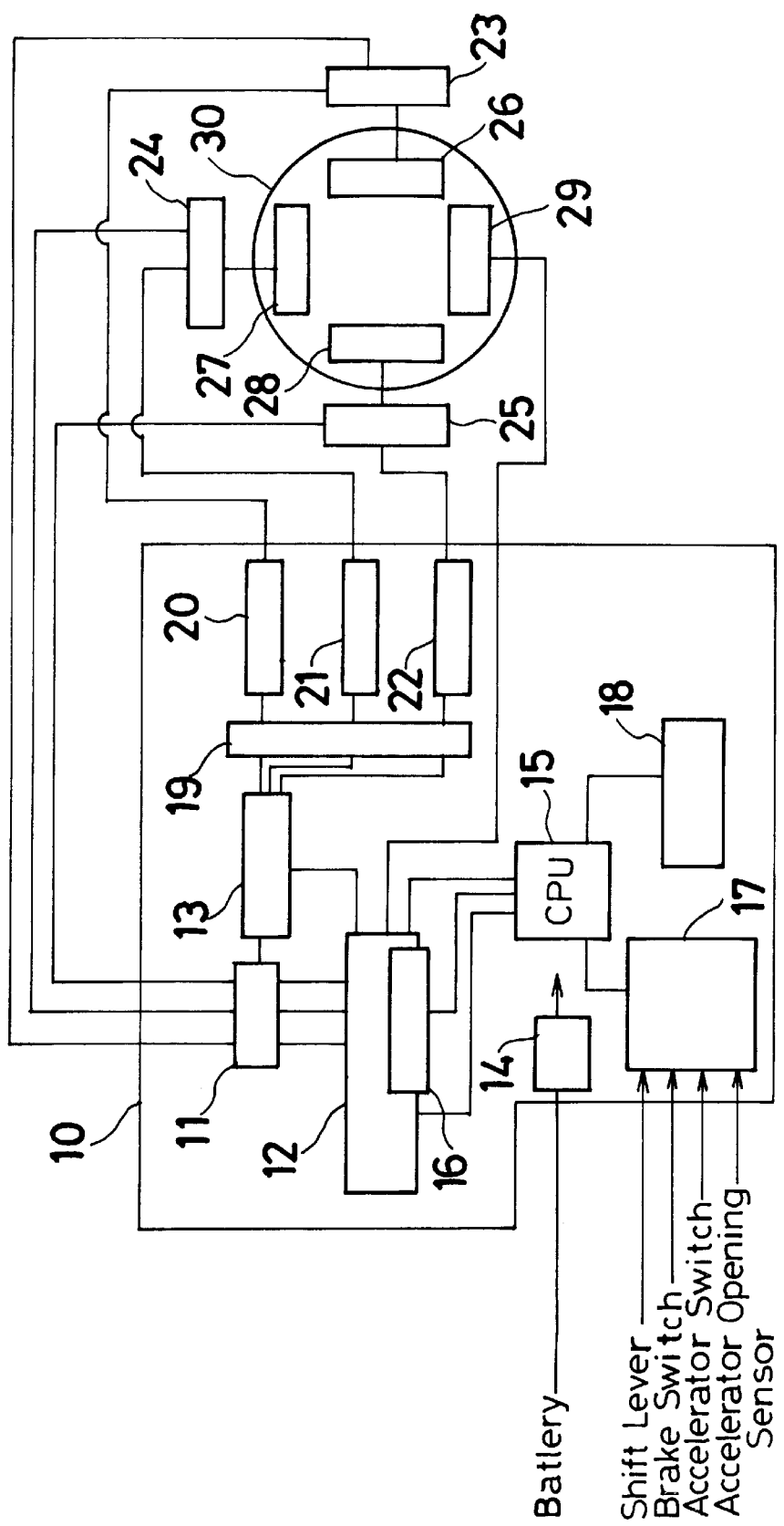
FIG. 1 is a block diagram showing the structure of an energization controller of a motor according to a first embodiment of the present invention.

FIG. 1 shows a structure of the unit according to a first embodiment of the present invention. The unit shown in FIG. 1 constitutes a main part of a driving unit of an electric car. According to the present embodiment, the exemplary unit comprises one SR motor 30 which is controlled by a controller 10. The controller 10 controls the drive of the SR motor 30 based on information input from a shift lever, a brake switch, an accelerator switch and an accelerator opening sensor. Electric power for the control is supplied from a car battery.

Figure 5:
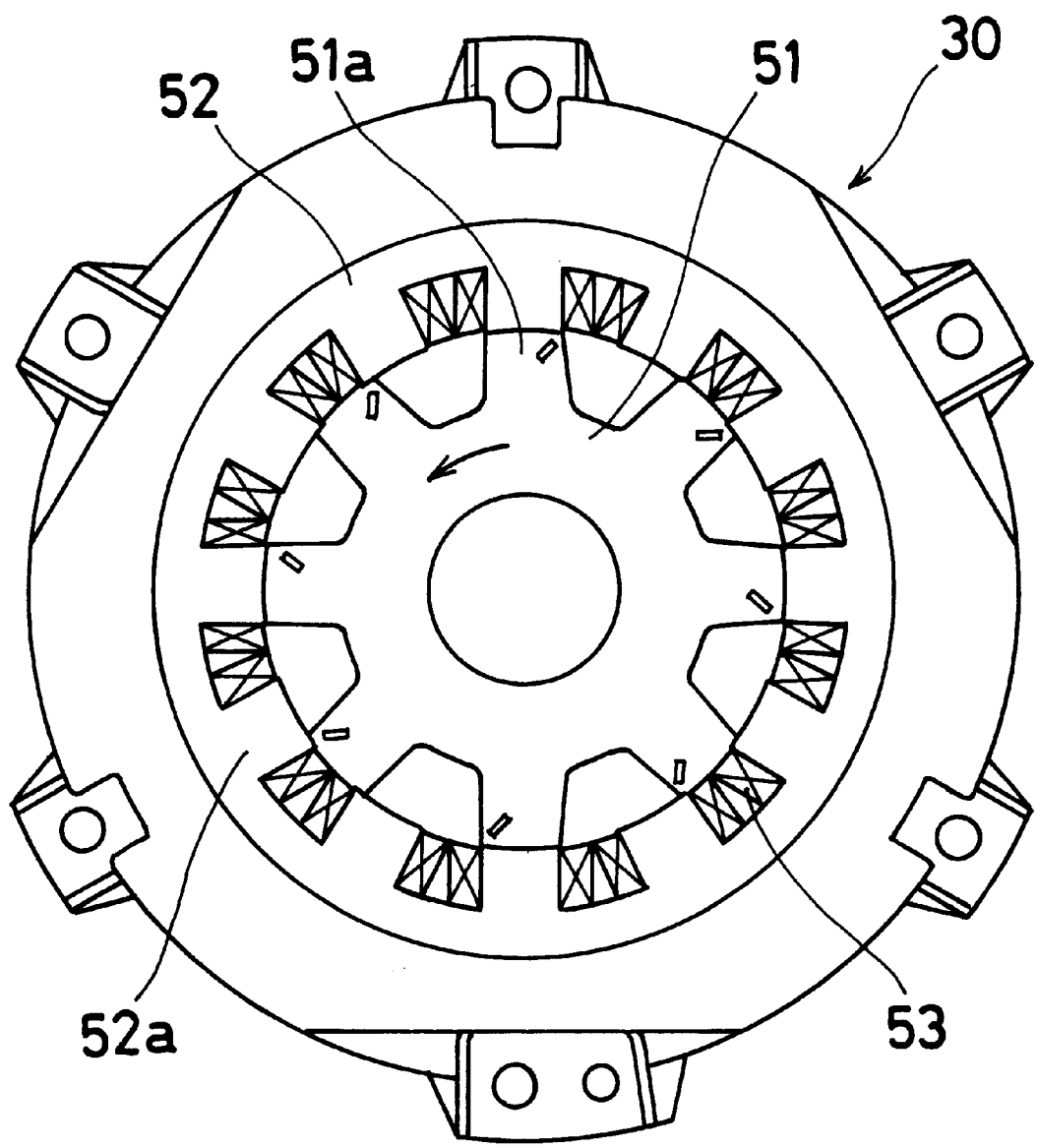
FIG. 5 is a side view of an SR motor in FIG. 1.

As shown in FIG. 5, the SR motor 30 comprises a hollow cylindrical stator 52 having poles 52a which protrude inward in the radial direction and a rotor 51 having poles 51a which protrude outward in the radial direction. In the present embodiment, the number of the poles 52a of the stator 52 is set at 12 and the number of the poles 51a of the rotor 51 is set at eight. A coil 53 is wound round each pole 52a of the stator 52, respectively. The coils 53 are wound around three groups of poles, each composed of four poles 52a of the stator 52 which face to the four poles 51a of the rotor 51 at the same time when the rotor 51 rotates. The coils are connected in series respectively and form a first phase coil 26, a second phase coil 27 and a third phase coil 28 shown in FIG. 1. When one of these coils 26 through 28 in FIG. 1 is energized, an attractive force acts between the poles 52a of the stator 52 around which the coils are wound respectively and the poles 51a of the rotor 51, thus rotating the rotor 51. The rotation of the rotor 51 is detected by an angle sensor 25 and the energization of the first through third phase coils 26 through 28 is switched sequentially from the first phase to the second phase and to the third phase corresponding to the rotation of the rotor 51 to continuously rotate the rotor 51. The first through third phase coils 26 through 28 are connected respectively with first through third phase drivers 20, 21 and 22 within the controller 10 which will be described later and current sensors 23, 24 and 25 are provided on a signal line connecting the first phase coil 26 with the first phase driver 20, a signal line connecting the second phase coil 27 with the second phase driver 21 and a signal line connecting the third phase coil 28 with the third phase driver 22, respectively. These current sensors 23 through 25 output voltages proportional to currents actually flowing through the first through third phase coils 26 through 28 as current signals (energization current value).

The controller 10 comprises a CPU (microcomputer) 15, an input interface 17, a map memory 18, a power circuit 14, a current waveform generating circuit 12, a comparator circuit 11, an output discriminating circuit 13, a partial hard-chopping circuit 19, the first phase driver 20, the second phase driver 21 and the third phase driver 22. The input interface 17 receives signals from the shift lever, the brake switch, the accelerator switch and the accelerator opening sensor equipped in the vehicle and not shown and sends these signals to the CPU 15. Based on the information obtained from these signals, the CPU 15 calculates a target driving speed and driving torque of the SR motor 30 sequentially and based on the calculated result, finds waveforms of currents to be sent to the first through third phase coils 26 through 28. Then, the CPU 15 reads the selected current waveforms from the map memory 18 (a current map memory 18a and a shift memory 18b) and sets in a bi-directional memory 16 provided within the current waveform generating circuit 12.

Figure 2:
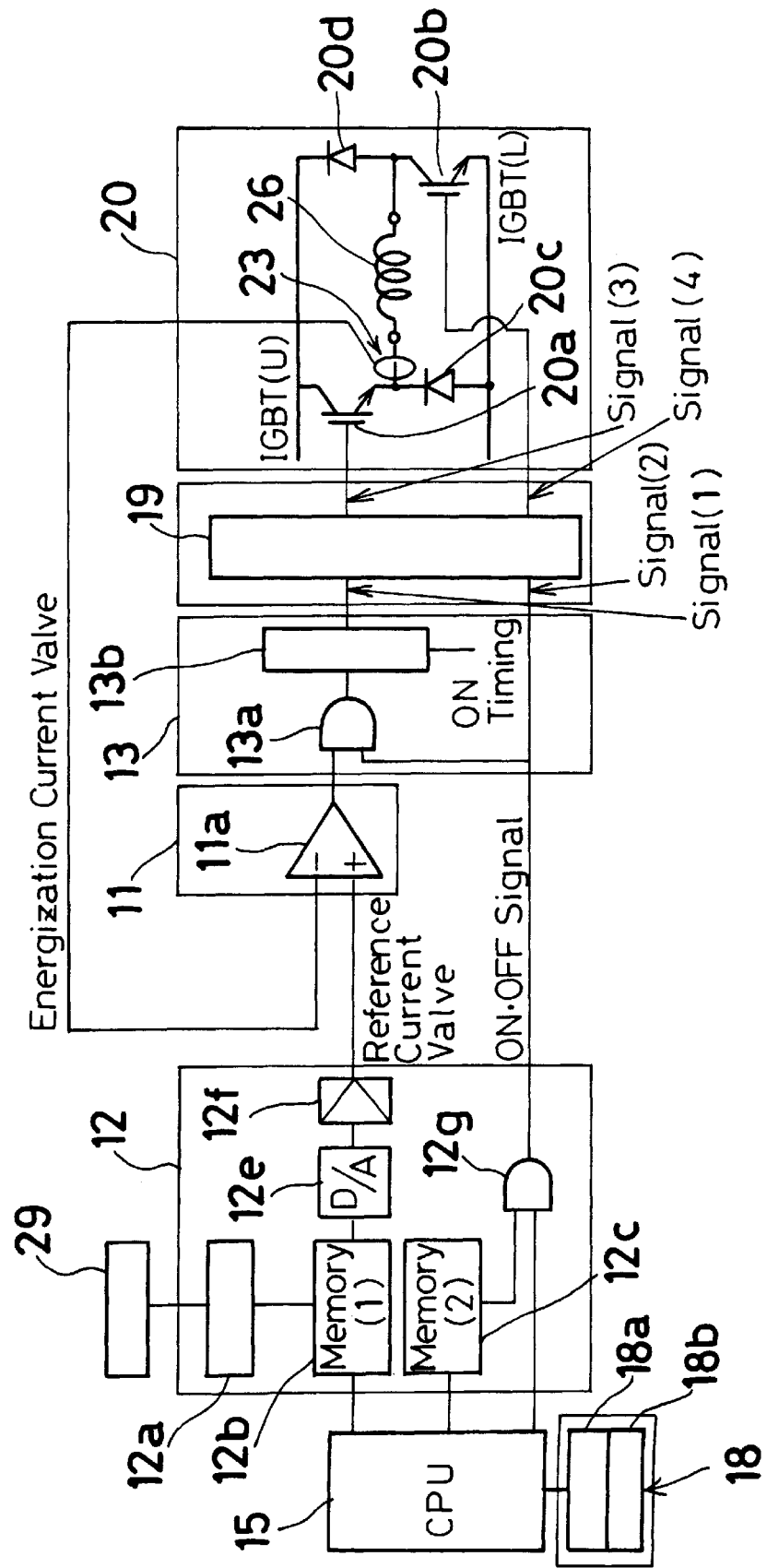
FIG. 2 is a block diagram showing the structure of part of the energization controller in FIG. 1 in detail.

FIG. 2 shows a detailed structure of part of the circuit shown in FIG. 1. Although only the circuit for controlling energization of the first phase coil 26a of the SR motor 30 is shown in FIG. 2, the unit actually contains the same circuits for controlling energization of the second and third phase coils 27 and 28.

As shown in FIG. 2, the current waveform generating circuit 12 comprises an address decoder 12a, two memories 12b and 12c, a digital-analog converter 12e, an output buffer 12f and an AND circuit 12g. Motor exciting timing corresponding to the angle of rotation of the rotor sent from the CPU 15 is stored in the address corresponding to the angle of rotation of the rotor. An output of the angle sensor 29 is converted into an address value by the address decoder 12a to specify a reading address of the memories 12b and 12c. Therefore, a target current value corresponding to the angle of rotation of the SR motor 30 is read from the memory 12b and it is read from the memory 12c whether or not to energize the coil at that point of time. The value read from the memory 12c is output as an ON/OFF signal via the AND circuit 12g. It is noted that a control signal from the CPU 15 is also input to the AND circuit 12g, so that the ON/OFF signal can be turned off forcibly regardless of the value of the memory 12c.

While the value read from the memory 12b is a digital value, the digital-analog converter 12e converts it into an analog signal to send to a non-inversion input terminal of a comparator 11a of the comparator circuit 11 via the output buffer 12f as a reference current value. Meanwhile, a current flowing through the first phase coil 26 of the first phase driver 20 is detected by the current sensor 23 and is sent to an inversion input terminal of the comparator 11a as an energization current value. The comparator 11a compares the reference current value and the energization current value and outputs its result as a current comparison signal to an AND circuit 13a of the output discriminating circuit 13.

Figure 3:
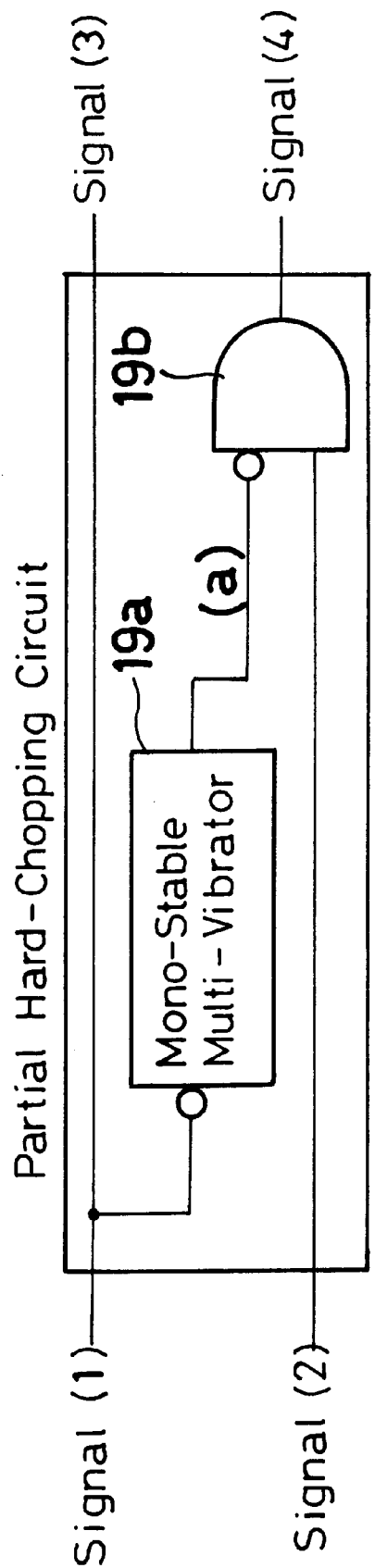
FIG. 3 is a block diagram showing a partial hard-chopping circuit from FIG. 2.

As shown in FIGS. 2 and 3, the output discriminating circuit 13 comprises the AND circuit 13a and a timing control circuit 13b. The current comparison signal output from the comparator 11a of the comparator circuit 11 and the ON/OFF signal output from the AND circuit 12g of the current waveform generating circuit 12 are input to the input terminal of the AND circuit 13a and an output terminal of the AND circuit 13a is connected to an input terminal of the timing control circuit 13b.

Figure 4:
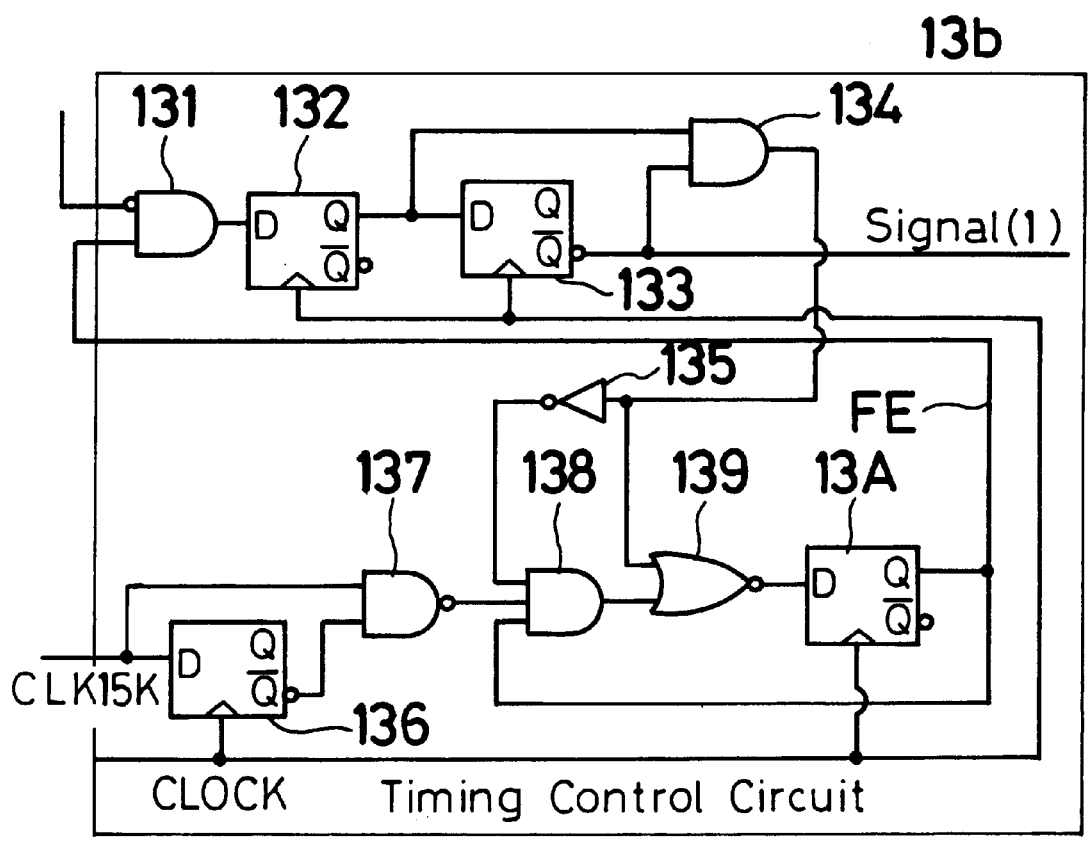
FIG. 4 is a block diagram showing a timing control circuit from FIG. 2.

The timing control circuit 13b uses a pulse signal whose frequency is 15 KHz as a synchronizing signal (ON timing) CLK 15K and comprises gate circuits 131, 134, 137, 138 and 139, D-type flip-flops 132, 133, 136 and 13A and an inverter 135 in the present embodiment as shown in FIG. 4. The structure of the timing control circuit 13b is the same as that of the circuit shown in the above-mentioned Japanese Patent Laid Open No. Hei. 8-172793. When the input signal output from the AND circuit 13a shows the condition of energization current value>reference current value, a signal FE is switched to "ON disabled" and is switched to "ON enabled" at the timing of the rise of the synchronizing signal CLK 15K of 15 KHz. Then, a signal (1) which is an output signal of the timing control circuit 13b turns to OFF when the input signal output from the AND circuit 13a shows the condition of energization current value>reference current value and turns to ON when the input signal shows a condition of energization current value<reference current value after which the "ON disabled" of the signal FE is canceled.

Figure 6:
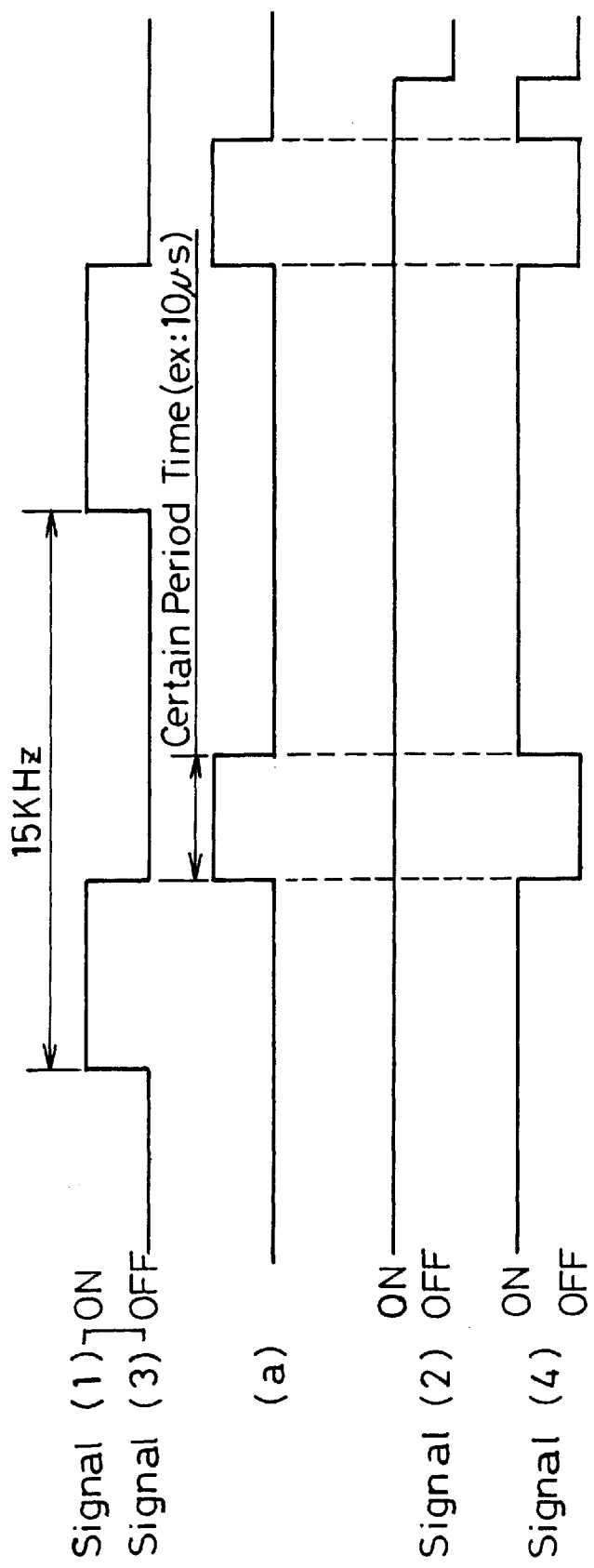
FIG. 6 is a time chart showing the operation of the partial hard-chopping circuit shown in FIG. 2.

The signal (1) from the timing control circuit 13b is input to the partial hard-chopping circuit 19. According to the present embodiment, the partial hard-chopping circuit 19 comprises a mono-stable multi-vibrator 19a and an AND circuit 19b as shown in FIG. 3. The signal (1) is input to the mono-stable multi-vibrator 19a and the mono-stable multi-vibrator 19a outputs a signal (a) on Hi level for a certain period of time (e.g. 10 to 15 $\mu$s) from the fall (OFF) of the signal (1) as shown in FIG. 6. This signal (a) is inverted and input to an input terminal of the AND circuit 19b. A signal (2), which is the ON/OFF signal output from the AND circuit 12g of the current waveform generating circuit 12, is also input to the input terminal of the AND circuit 19b. The AND circuit 19b outputs an ON/OFF signal as a signal (4) which turns to ON only when the signal (a) is on Lo level and the signal (2) is ON.

In FIGS. 2 and 3, the signal (1) is input to a base of an upper transistor 20a of the first phase driver 20 as a signal (3) from the partial hard-chopping circuit 19 as it is. A collector of the upper transistor 20a is connected to a line of high potential supplied from the power circuit 14. An emitter of the upper transistor 20a is connected to one end of the first phase coil 26. The other end of the first phase coil 26 is connected to a collector of a lower transistor 20b. An emitter of the lower transistor 20b is connected to a line of low potential supplied from the power circuit 14. The signal (4) is input to a base of the lower transistor 20b. A diode 20c for flywheel is interposed between one end of the first phase coil 26 and the low potential line and a diode 20d for flywheel is interposed between the other end of the first phase coil 26 and the high potential line. Therefore, a current flows between the high and low potential lines and the first phase coil 26 when both of the upper and lower transistors 20a and 20b are turned on (put in the conductive state) and the current fed to the first phase coil 26 may be stopped by turning off either one or both of them (put in the non-conductive state). It is noted that the value of current flowing through the first phase coil 26 may be detected by the current sensor 23.

ON/OFF of the upper transistor 20a is controlled based on the current comparison signal output by the comparator 11a when the ON/OFF signal output from the AND circuit 12g of the current waveform generating circuit 12 is on Hi level (power-on). However, the relationship between ON/OFF of the current comparison signal and ON/OFF of the upper transistor 20*a* is not that of one-to-one and hence the timing thereof is regulated by the timing control circuit 13*b* described above. That is, the signal FE of the timing control circuit 13*b* in FIG. 4 turns to Hi level (ON disabled) when the energization current value exceeds the reference current value and turns to Lo level (ON enabled) at each timing of the synchronizing signal. Then, the signal (1) turns to OFF when the energization current value exceeds the reference current value and turns to ON when the signal FE is "ON enabled" and when the energization current value is equal to or exceeds over the reference current value. Thus, even when the reference current value falls below the energization current value just before the timing of the synchronizing signal and the reference current value still falls below the energization current value at the timing of the synchronizing signal right after that, the signal (1) turns to ON when the energization current value exceeds the reference current value after the signal FE turns to "ON enabled", so that the ON/OFF period of the signal (1) is regulated so as to almost coincide with the period (reference chopping period) of the synchronizing signal and the frequency barely changes. Further, when the ON/OFF signal output from the AND circuit 12*g* is on Hi level (power-on), the lower transistor 20*b* turns on/off corresponding to the signal (a) input to the AND circuit 19*b* of the partial hard-chopping circuit 19.

Accordingly, when the energization current value is equal to or falls below the reference current value, the signals (2) and (4) turn to ON at the same time the signals (1) and (2) turn to ON, as shown in FIG. 6 and therefore, both the upper and lower transistors 20*a* and 20*b* turn on, thus feeding a current to the first phase coil 26. Then, when the energization current value exceeds the reference current value, the signals (1) and (3) turn to OFF. The signal (1) which has turned to OFF is input to the mono-stable multi-vibrator 19*a* of the partial hard-chopping circuit 19 shown in FIG. 3 and the monostable multi-vibrator 19*a* outputs the Hi level signal (a) for a predetermined period of time (10 to 15 μs). The signal (a) is inverted and is input to the AND circuit 19*b* and thereby, the output signal (4) of the AND gate 19*b* turns to OFF. Thus, the upper and lower transistors 20*a* and 20*b* are both turned off and a current flows, quickly (falling speed is fast) from the low potential line to the high potential line through the diodes 20*c* and 20*d* by the energy accumulated in the first phase coil 26. Then, when the predetermined period of time elapses, the output signal (a) of the monostable multi-vibrator 19*a* turns to Lo level and thereby, the output signal of the AND circuit 19*b* turns to ON. Thus, the lower transistor 20*b* is turned on while the upper transistor 20*a* is turned off (soft-chopping) and a current flows slowly (falling speed is slow) through a closed loop of the diode 20*c*, the first phase coil 26 and the lower transistor 20*b* by the energy accumulated in the first phase coil 26. ON/OFF of the upper and lower transistors 20*a* and 20*b* are repeatedly controlled as described above to control the current fed to the coil in the present embodiment.

Figure 7:
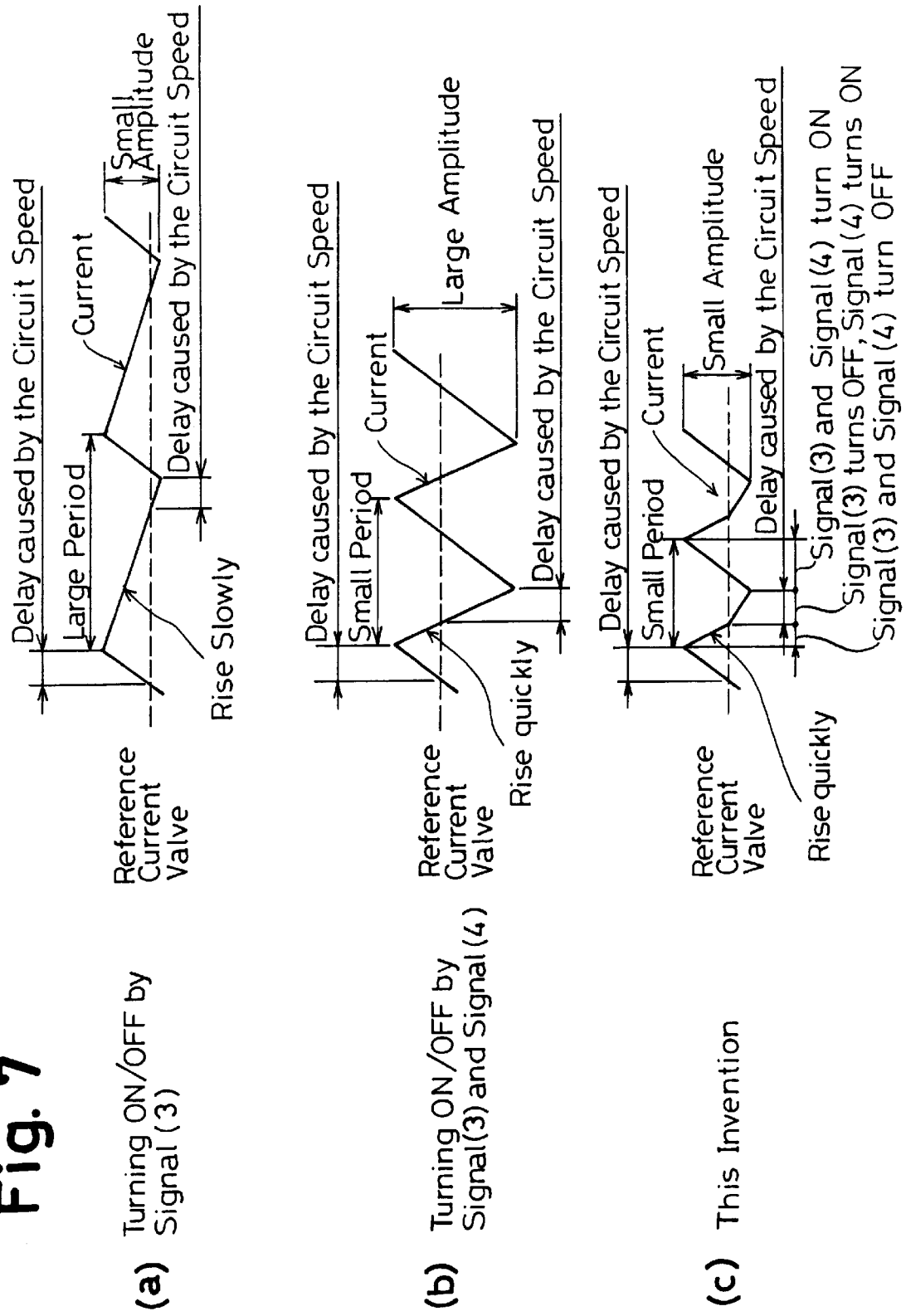
FIG. 7 is a time chart showing waveforms of a reference current value and an energization current.
Figure 13A:
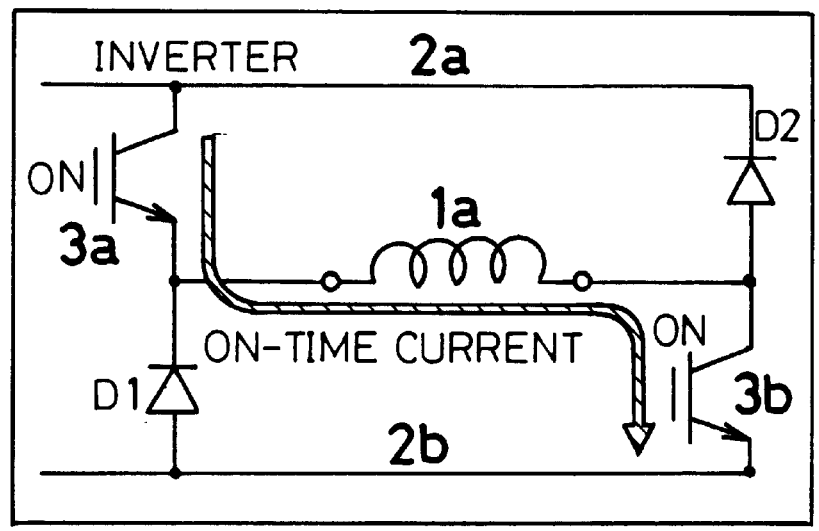
Figure 13B:
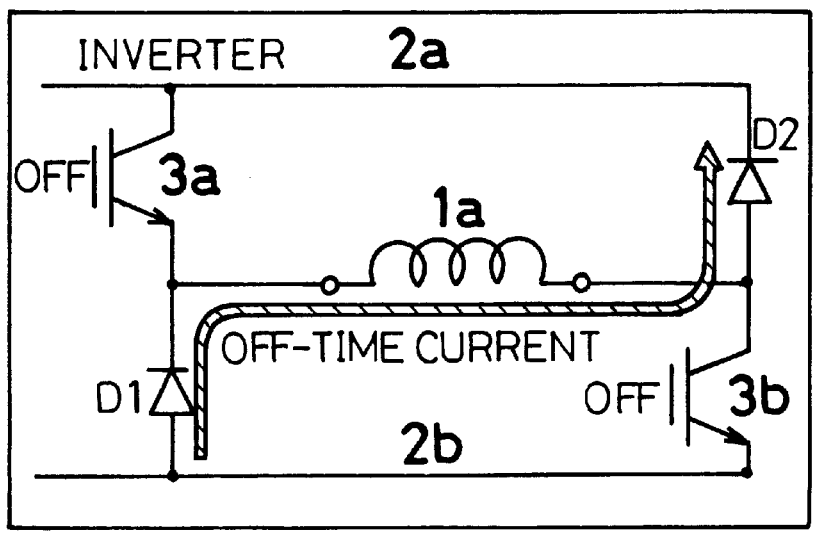
Figure 14A:
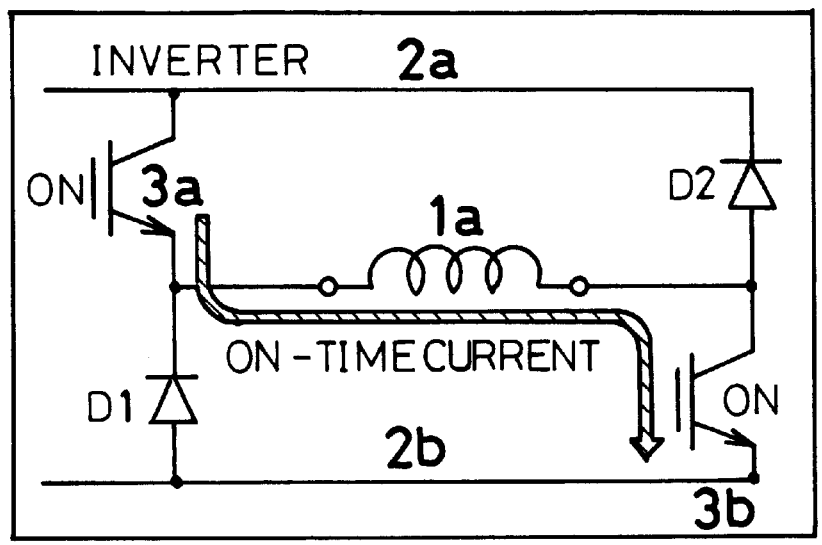
Figure 14B:
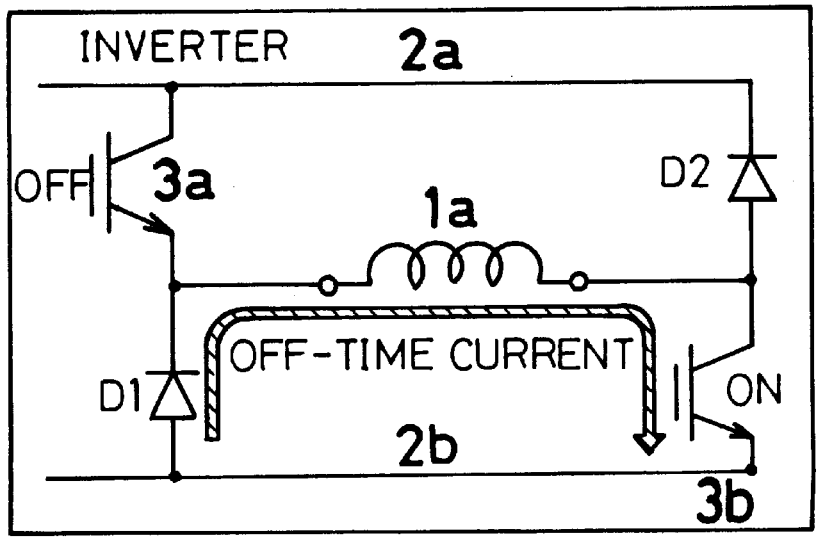

In the above-mentioned prior art energization controller, the energization of the coil is controlled by selecting, based on a number of revolutions of the motor and required torque, the soft-chopping mode of alternately repeating the state of turning on both of the upper transistor (first switching element) 3*a* and the lower transistor (second switching element) 3*b* and the state of turning off only the upper transistor 3*a* and of keeping the lower transistor 3*b* on, as shown in FIGS. 14*a* and 14*b*, and the hard-chopping mode of alternately repeating the state of turning on both of the upper and lower transistors 3*a* and 3*b* and the state of turning off both of the transistors 3*a* and 3*b* as shown in FIGS. 13*a* and 13*b*. FIG. 7*a* is a time chart showing the reference current value and a waveform of the current flowing through the coil in the soft-chopping mode and FIG. 7*b* is a time chart showing the reference current value and a waveform of the current flowing through the coil in the hard-chopping mode. It is noted that rise and fall inflection points of the current above and under the reference current value are brought about by the delay caused by the circuit speed.

In the SR motor, magnetic mechanical resistance varies depending on the rotational position of the rotor with respect to the stator and thereby, inductance L of the coil varies. The desired falling speed of the waveform of the coil current is maintained in either the hard or soft chopping modes when the inductance L is small and the timing control circuit causes the chopping frequency to approach to the desired chopping frequency in the prior art energization controller described above. However, when the inductance L is large, the falling speed of the coil current becomes slow during the soft-chopping and the upper transistor may not turn on because the reference current value is equal to or falls below the energization current value even when the timing of the synchronizing signal of the timing control circuit passes. When such a delay occurs, noise in the audible range is generated by the chopping because the period for turning on/off the transistor becomes large, though the current amplitude is small. Further, during the hard-chopping mode, although no noise in the audible range is generated because the period is suppressed from becoming large because the falling speed of the current is fast even when the inductance L is large, the variation of the magnetic attractive force applied to the rotor of the SR motor becomes large because the current amplitude becomes large due to the influence of the delay of the circuit speed, thus causing vibrations and generating large noise.

Meanwhile, ON/OFF of the upper and lower transistors 20*a* and 20*b* is controlled in the mode in which the hard-chopping and the soft-chopping are combined as described above in the present embodiment. That is, the upper and lower transistors 20*a* and 20*b* are both turned off for a predetermined period of time (10 to 15 μs) and the coil current falls to a desired level (e.g. the reference current value) quickly when the reference current value is equal to or falls below the energization current value as shown in FIG. 7*c*.

Then, around the time when the coil current falls to the desired level, i.e. after the elapse of the predetermined period of time, only the lower transistor 20*b* is turned on and the falling of the coil current becomes moderate. Thus, the coil current is suppressed from excessively falling in the region where the circuit delay is influential. As a result, the desired chopping frequency can be maintained and the noise in the audible range and the vibrational noise are prevented from generating without increasing the current amplitude regardless of the magnitude of the inductance of the coil.

Figure 8:
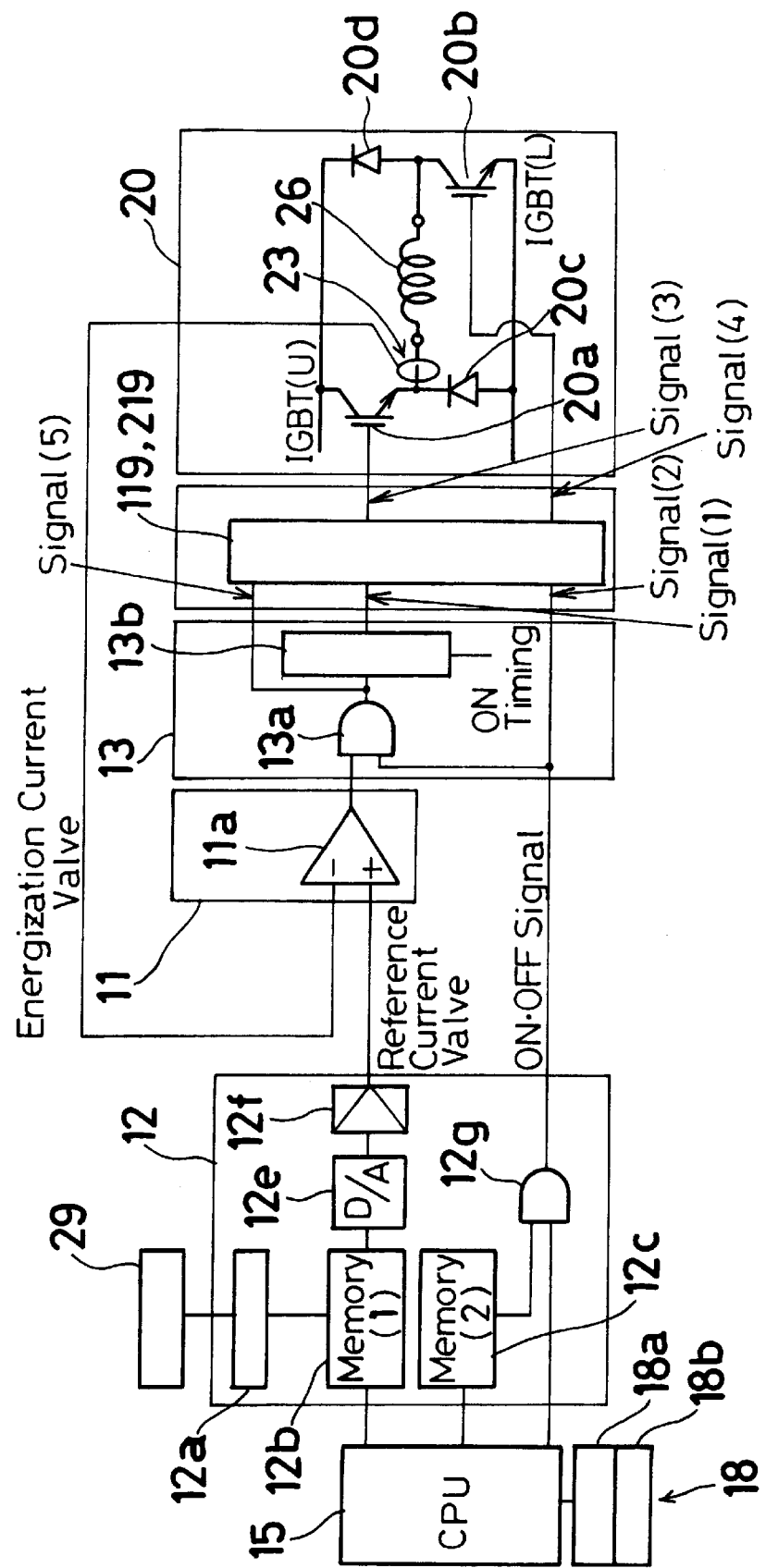
FIG. 8 is a block diagram showing the structure of an energization controller of the motor according to second and third embodiment of the invention.

FIG. 8 is a block diagram of an energization controller of an electric motor according to second and third embodiments of the present invention. Because the structure shown in FIG. 8 is the same with that shown in FIG. 2 except for the partial hard-chopping circuit, the same reference numerals denote the same components and an explanation thereof will be omitted here. It is noted that although FIG. 8 shows only the circuit for controlling the energization of the first phase coil 26 of the SR motor 30 in FIG. 1 in the same manner as FIG. 2, the unit actually contains the same circuits for controlling the energization of the second and third phase coils 27 and 28.

Figure 9:
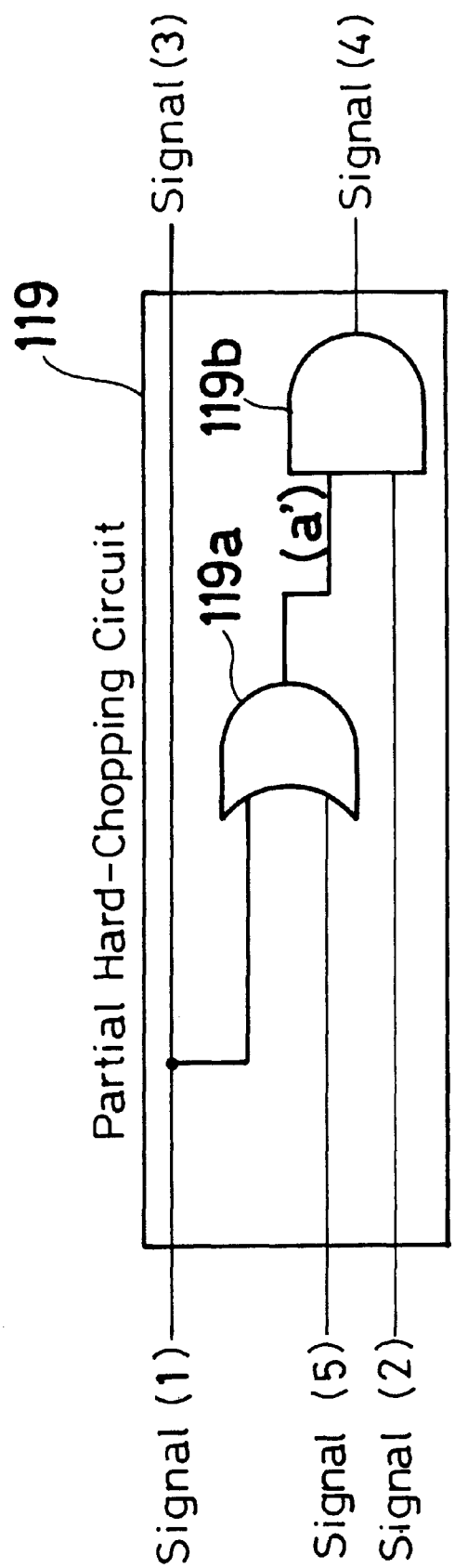
FIG. 9 is a block diagram showing a partial hard-chopping circuit according to the second embodiment.
Figure 10:
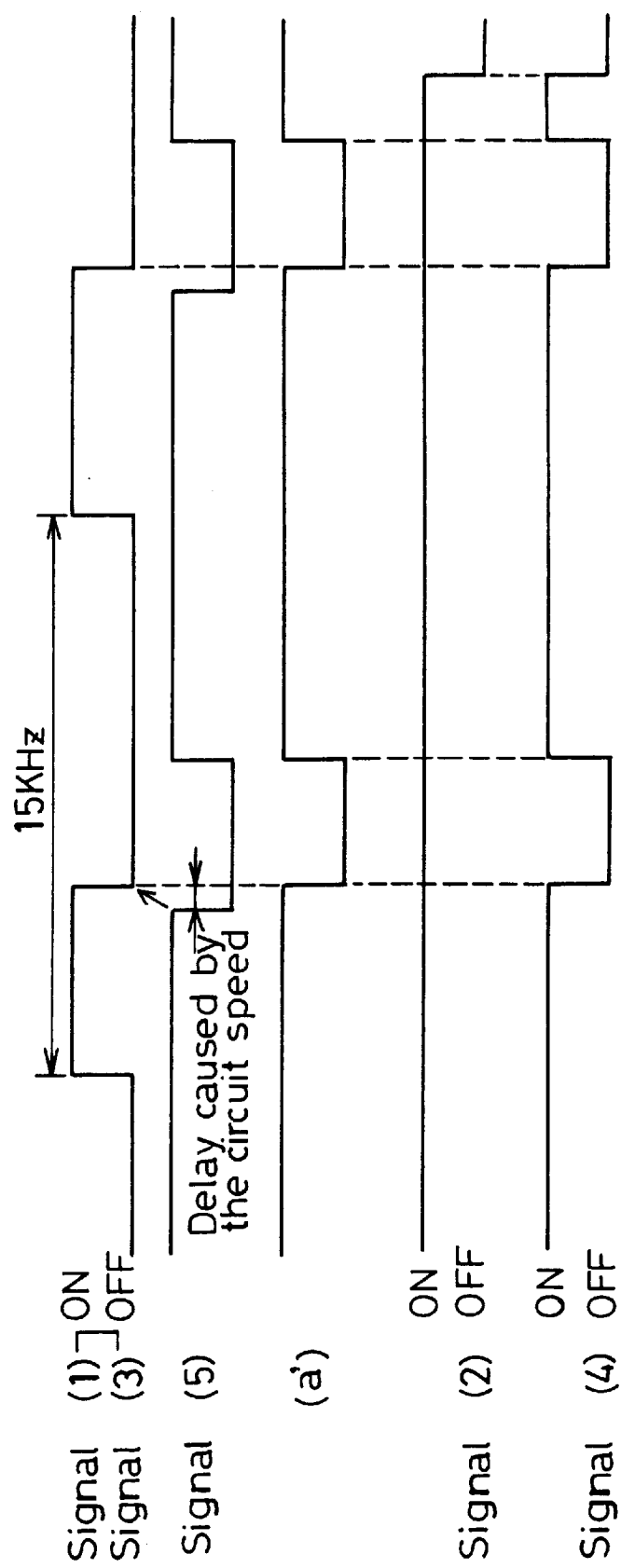
FIG. 10 is a time chart showing the operation of the partial hard-chopping circuit shown, in FIG. 9.

FIG. 9 shows a partial hard-chopping circuit 119 of the second embodiment. As shown in FIG. 9, the partial hard-chopping circuit 119 comprises an OR circuit 119a and an AND circuit 119b. The signal (1) output from the timing control circuit 13b of the output discriminating circuit 13 as well as the output signal of the AND circuit 13a of the output discriminating circuit 13, i.e. a signal (5), are input to the OR circuit 119a. An output signal (a') of the OR circuit 119a is input to the AND circuit 119b to which the ON/OFF signal output from the AND circuit 12g of the current waveform generating circuit 12 is input as the signal (2). It is noted that the signal (1) is connected to the base of the upper transistor 20a as the signal (3) from the partial hard-chopping circuit 119 and the signal (4) output from the AND circuit 119b is connected to the base of the lower transistor 20b.

In the second embodiment, the current comparison signal of the comparator 11a turns to Lo level when the reference current value is equal to or falls below the energization current value and corresponding to that, the signal (5) which is the output signal of the AND circuit 13a of the output discriminating circuit 13 turns to Lo level. In response to that, the signal (1) turns to OFF after a delay time caused by the speed of the circuit and the signal (a') from the OR circuit 119a turns to Lo level. As a result, the signals (3) and (4) are both turned off and the upper and lower transistors 20a and 20b are both turned off, thus lowering the current quickly. Due to this quick fall, the current comparison signal of the comparator 11a turns to Hi level when the energization current value falls below the reference current value and in response to that, the signal (5) turns to Hi level. Because the signal (1) which is the output signal from the timing control circuit 13b will not turn to ON until the next synchronizing signal comes, the signal (3) is kept OFF. Thus, the signal (a') turns to Hi level and the signal (4) turns to ON, thus turning on only the lower transistor 20b. Therefore, according to this second embodiment, it is possible to suppress the current from falling excessively in the region where the circuit delay is influential by quickly lowering the current by turning off both of the transistors 20a and 20b when the reference current value is equal to or falls below the energization current value and by turning on only the lower transistor 20b when the energization current value falls below the reference current value. It then allows the period of chopping to be shortened and the current amplitude to be reduced, thus preventing the noise in the audible range and the vibrational noise from being generated.

Figure 11:
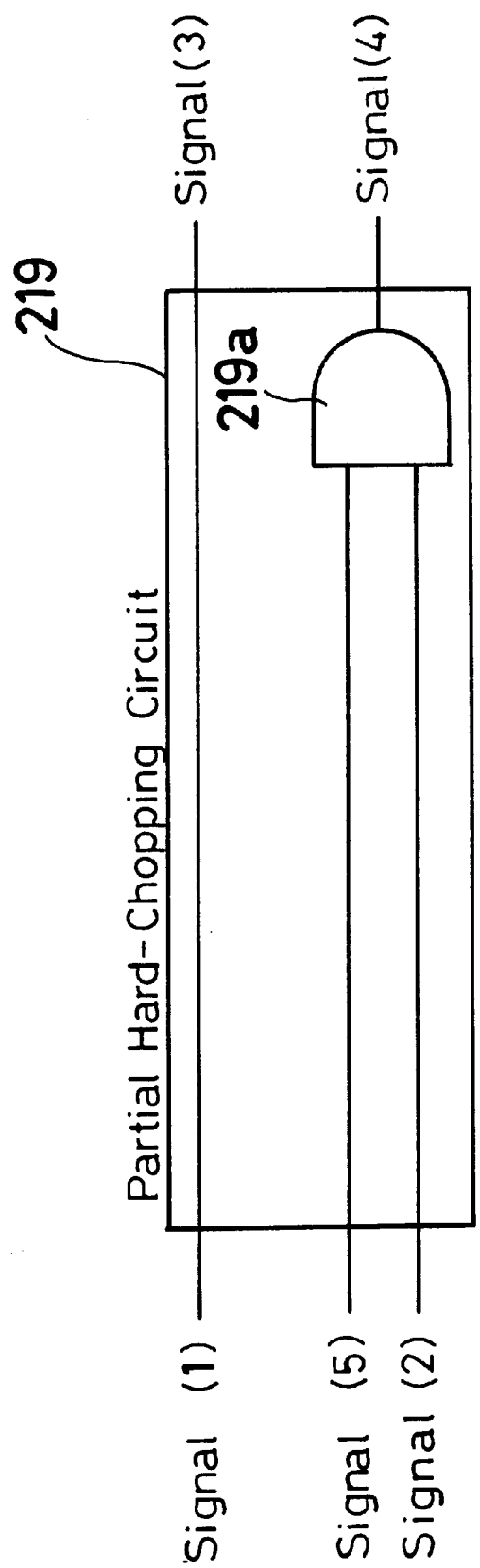
FIG. 11 is a block diagram showing the partial hard-chopping circuit according to the third embodiment of the invention.

FIG. 11 shows a partial hard-chopping circuit 219 of the third embodiment. As shown in FIG. 11, the partial hard-chopping circuit 219 comprises an AND circuit 219a. The output signal of the AND circuit 13a of the output discriminating circuit 13 is input as the signal (5) and the ON/OFF signal output from the AND circuit 12g of the current waveform generating circuit 12 is input as the signal (2) to the AND circuit 219a. It is noted that the signal (1) output from the timing control circuit 13b of the output discriminating circuit 13 is connected to the base of the upper transistor 20a as the signal (3) from the partial hard-chopping circuit 219 and the signal (4) output from the AND circuit 119b is connected to the base of the lower transistor 20b.

In the third embodiment, the current comparison signal of the comparator 11a turns to Lo level when the reference current value is equal to or falls below the energization current value and corresponding to that, the signal (5) which is the output signal of the AND circuit 13a of the output discriminating circuit 13 turns to Lo level as shown in FIG. 12. In response to that, the signal (4) from the AND circuit 219a turns to OFF and the signal (1) turns to OFF after a delay time caused by the speed of the circuit. As a result, both of the signals (3) and (4) turn to OFF and the upper and lower transistors 20a and 20b are both turned off, thus lowering the current quickly. Due to this quick fall, the current comparison signal of the comparator 11a turns to Hi level when the energization current value falls below the reference current value and in response to that, the signal (5) turns to Hi level, the signal (4) turns to ON and the lower transistor 20b is turned on. Because the signal (1) which is the output signal from the timing control circuit 13b will not turn to ON until when the next synchronizing signal comes, the signal (3) is kept OFF. Therefore, it is possible to suppress the current from falling excessively in the region where the circuit delay is influential also in the third embodiment by quickly lowering the current by turning off both of the transistors 20a and 20b when the reference current value equals to or falls below the energization current value and by turning on only the lower transistor 20b when the energization current value falls below the reference current value similarly to the second embodiment. Therefore, it allows the period of chopping to be shortened and the current amplitude to be reduced, thus preventing the noise in the audible range and the vibrational noise from being generated.

As described above, according to the present invention, the desired chopping frequency may be maintained without increasing the current amplitude regardless of the magnitude of the inductance of the coil because the coil current falls with a relatively quick falling speed by turning off both the first and second switching means when the first signal becomes larger than the second signal and then the coil current falls with the relatively slow falling speed lo by turning on only the second switching means. Thus, it is possible to prevent the noise in the audible range which is otherwise caused when the chopping frequency is lowered and the vibrational noise which is otherwise caused when the current amplitude becomes large from occurring appropriately.

While the preferred embodiments have been described, variations thereto will occur to those skilled in the art within the scope of the present inventive concepts which are delineated by the following claims.

What is claimed is:

1. An energization controller for an electric motor for controlling ON/OFF of energization of coils of the electric motor by comparing the relationship of magnitude of a first signal corresponding to a current which is chopped and which actually flows through the coil of the electric motor and a second signal defining a reference current value and by utilizing a binary signal corresponding to the result of the comparison, said energization controller comprising:
 first switching means interposed between one end of said electric coil of said electric motor and a first power line;
 second switching means interposed between the other end of said electric coil and a second power line;
 a first diode which is interposed between one end of said electric coil and said second power line and which permits a current to conduct from the second power line to the one end of the coil;

a second diode which is interposed between the other end of said electric coil and said first power line and which permits a current to conduct from the other end of the coil to the first power line; and chopping control means which turns off both of said first and second switching means for a predetermined period of time and then turns on only said second switching means when the first signal exceeds over the second signal and which turns on both of said first and second switching means when the first signal falls below the second signal and the predetermined period of time elapses.

2. The energization controller of the electric coil as described in claim 1, wherein said chopping control means turns off both of said first and second switching means for a time until when the first signal falls below the second signal when the first signal exceeds over the second signal and after the elapse of that time, turns on only the second switching means until the predetermined time elapses.

* * * * *